US011978333B2

(12) United States Patent
Escofet et al.

(10) Patent No.: US 11,978,333 B2
(45) Date of Patent: May 7, 2024

(54) AUTOMATIC ADDRESSING FOR FIRE LOOP

(71) Applicant: Carrier Corporation, Palm Beach Gardens, FL (US)

(72) Inventors: Jordi Escofet, Barcelona (ES); Andres Cordoba, Barcelona (ES); Ramon De La Torre, Barcelona (ES); Santiago Vilarrubla Canals, Barcelona (ES)

(73) Assignee: CARRIER CORPORATION, Palm Beach Gardens, FL (US)

(*) Notice: Subject to any disclaimer, the term of this patent is extended or adjusted under 35 U.S.C. 154(b) by 38 days.

(21) Appl. No.: 17/958,814

(22) Filed: Oct. 3, 2022

(65) Prior Publication Data

US 2023/0108030 A1 Apr. 6, 2023

(30) Foreign Application Priority Data

Oct. 4, 2021 (EP) .................................... 21382893

(51) Int. Cl.
*G08B 25/00* (2006.01)
*G08B 17/00* (2006.01)
*A62C 37/36* (2006.01)

(52) U.S. Cl.
CPC ........... *G08B 25/003* (2013.01); *G08B 17/00* (2013.01); *A62C 37/04* (2013.01)

(58) Field of Classification Search
CPC .................................................... G08B 25/003
See application file for complete search history.

(56) References Cited

U.S. PATENT DOCUMENTS 4,977,527 A 12/1990 Shaw et al.
5,051,722 A 9/1991 Hugon
(Continued)

FOREIGN PATENT DOCUMENTS

CA 1340075 C 10/1998
CA 1340093 C 10/1998
(Continued)

OTHER PUBLICATIONS

Author Unknown, "Fire Alarm Systems", ESSER by Honeywell, Product Catalog 2015, (p. 110—Automatic Detectors: Series ES Detect), 330 Pages.
(Continued)

*Primary Examiner* — Travis R Hunnings
(74) *Attorney, Agent, or Firm* — CANTOR COLBURN LLP

(57) ABSTRACT

An automatic addressing system for a fire loop and a method for automatically addressing a plurality of remote units electrically connected to a fire panel in a fire loop, the method including: (1) requesting an initial identifier from each remote unit; (2) for each remote unit which responds with a unique initial identifier: (a) assigning a unique address to the remote unit; and (b) silencing the response of the configured remote unit to further identifier requests; (3) for each remote unit which responds with an initial identifier matching the initial identifier of at least one other remote unit: (a) initialising an identifier array with the initial identifier for the remote unit in question; (b) requesting a further identifier and adding it to the identifier array for the remote unit; (c) for each remote unit which responds with a unique identifier array: (i) assigning a unique address to the remote unit.

15 Claims, 2 Drawing Sheets

(56) References Cited

U.S. PATENT DOCUMENTS

| | | | | |
|---|---|---|---|---|
| 5,818,334 | A * | 10/1998 | Stanley | G08B 26/001 340/505 |
| 7,103,686 | B1 | 9/2006 | Lin et al. | |
| 7,251,742 | B2 | 7/2007 | Barrieau et al. | |
| 7,617,331 | B2 | 11/2009 | Rebulla et al. | |
| 8,299,911 | B2 | 10/2012 | Buss | |
| 9,633,554 | B1 | 4/2017 | Barson | |
| 11,080,979 | B2 | 8/2021 | Barson et al. | |
| 11,416,240 | B2 * | 8/2022 | Escofet Via | G06F 8/654 |
| 2002/0141402 | A1 | 10/2002 | Chang et al. | |
| 2020/0249934 | A1 | 8/2020 | Escofet Via et al. | |
| 2021/0048836 | A1 | 2/2021 | Bennett et al. | |
| 2021/0241595 | A1 * | 8/2021 | Young | G08B 17/00 |
| 2021/0327235 | A1 * | 10/2021 | Mukundala | G08B 7/066 |
| 2022/0108594 | A1 * | 4/2022 | Farley | G08B 17/00 |
| 2023/0018171 | A1 * | 1/2023 | Solis Vidal | G08B 25/003 |
| 2023/0108030 | A1 * | 4/2023 | Escofet | G08B 25/003 340/577 |

FOREIGN PATENT DOCUMENTS

| | | | |
|---|---|---|---|
| CA | 2665937 | A1 | 5/2008 |
| CN | 113077616 | A | 7/2021 |
| EP | 0191239 | A1 | 8/1986 |
| KR | 20140004974 | A | 1/2014 |
| RU | 87281 | U1 | 9/2009 |
| WO | 19224116 | A2 | 11/2019 |
| WO | 2019234678 | A1 | 12/2019 |

OTHER PUBLICATIONS

European Search Report for Application 21382893.2; dated Mar. 14, 2022; 5 Pages.

* cited by examiner

AUTOMATIC ADDRESSING FOR FIRE LOOP

FOREIGN PRIORITY

This application claims priority to European Patent Application No. 21382893.2, filed Oct. 4, 2021, and all the benefits accruing therefrom under 35 U.S.C. § 119, the contents of which in its entirety are herein incorporated by reference.

TECHNICAL FIELD OF INVENTION

The present invention relates to an automatic addressing system for a fire loop and to a related method for automatically addressing a plurality of remote units on a fire loop. The automatic addressing system may be used within a fire system for a building, the fire system comprising: a fire panel for monitoring the building and activating an alarm; and a plurality of remote units electrically connected to the fire panel in a fire loop.

BACKGROUND OF THE INVENTION

Typically, there is a regulatory requirement in buildings to have a fire system in place. These fire systems are used to identify possible fires in the building and alert authorities and/or occupants of the building of the possible fire. In some instances, fire systems can also identify other types of emergency, such as other emergencies that require evacuation of the building. Typical fire systems employ a fire panel and a number of remote units, with some of the remote units comprising indicating devices (e.g. smoke alarms, manual call points, heat detectors, etc.) and/or indicator devices (e.g. sirens, bells, lights, etc.). The remote units are typically distributed across the building and are connected to the fire panel through a communications network. There may be additional devices in the fire system, such as fire extinguishing devices that can be automatically triggered via the fire panel. In some fire alarm systems, the remote units are electrically connected to the fire panel in a loop configuration, and communication between the remote units and fire panel is achieved by modulating the current and voltage in the loop. The fire panel may determine specific actions for different zones of a building depending on the nature and location of the emergency. For example, the fire panel may raise an alarm across the whole building, but only trigger the fire extinguishing devices in the zone of the building where a fire has been detected. The fire panel may be connected to a further communication network, such as a WiFi network or telephone network, for the purposes of alerting authorities to the emergency.

In known systems, the fire panel and the remote units typically communicate through a master-slave communication system. The communication method, or protocol, varies from manufacturer to manufacturer. A typical basic protocol has two main parts: a query (or 'poll') of a remote unit by the fire panel requesting the remote unit address and control information, and a response from the remote unit, providing its status and other information. This communication may involve the fire panel receiving an input from a remote unit in the form of a modulation in the current and, if the input is indicative of a possible emergency, communicating an alarm condition in the form of modulations in the voltage to other remote units.

In some protocols, each device on the loop will be polled in turn. To increase speed around a loop, some protocols allow polling of groups of devices on a single communication. Whichever type of protocol is used, during a polling process it is necessary to have some form of an address, e.g. a unique identifier, specific for each of the remote units on the fire loop circuit, and that the polling communication is encoded with the relevant address(es), so that the targeted remote unit(s) know to respond (otherwise the remote unit will ignore the communication).

In order to assign each remote unit a unique address various systems have been proposed in the prior art. They can be considered to generally fall into two categories, manual addressing systems and automatic addressing systems. Manual addressing, in the case of fully electronic/data based systems, requires a specialised tool during installation in order to complete the addressing and store the address in an internal memory of the remote unit, or, in the case of electro-mechanical arrangements, may be achieved by means of DIP switches or rotary switches. Such manual addressing methods add significantly to the time needed for installation and can have a risk of human error leading to incorrect addressing.

On the other hand, automatic addressing systems can be managed through the fire panel, but the complexity of the addressing can be particularly problematic in large installations with large number of remote units of different types in the fire loop circuit.

SUMMARY OF THE INVENTION

Viewed from a first aspect, the invention provides a method of addressing a plurality of remote units electrically connected to a fire panel in a fire loop, the method comprising: (1) requesting an initial identifier from each remote unit; (2) for each remote unit which responds with a unique initial identifier: (a) assigning the remote unit a unique address; and (b) silencing the response of the configured remote unit to further identifier requests; (3) for each remote unit which responds with an initial identifier matching the initial identifier of at least one other remote unit: (a) initialising an identifier array with the initial identifier for the remote unit in question; (b) requesting a further identifier and adding it to the identifier array for the remote unit; (c) for each remote unit which responds with a unique identifier array: (i) assigning the remote unit a unique address; and (ii) silencing the response of the configured remote unit to further identifier requests; (d) for each remote unit which responds with an identifier array matching the identifier array of at least one other remote unit, repeating steps (3)(b)-(c) until all remote units of the plurality of remote units have been silenced; and (4) enabling communication of the plurality of remote units in the fire loop.

Viewed from a second aspect, the invention provides a fire system for a building, the fire system comprising: a fire panel for monitoring the building and activating an alarm; and a plurality of remote units electrically connected to the fire panel in a fire loop; wherein the fire panel is configured with an addressing mode for addressing the plurality of remote units in the fire loop, the addressing mode comprising: (1) requesting an initial identifier from each remote unit; (2) for each remote unit which responds with a unique initial identifier: (a) assigning a unique address to the remote unit; and (b) silencing the response of the configured remote unit to further identifier requests; (3) for each remote unit which responds with an initial identifier matching the initial identifier of at least one other remote unit: (a) initialising an identifier array with the initial identifier for the remote unit in question; (b) requesting a further identifier and adding it to the identifier array for the remote unit; (c) for each remote unit which responds with a unique identifier array: (i) assigning a unique address to the remote unit; and (ii) silencing the response of the configured remote unit to further identifier requests; (d) for each remote unit which responds with an identifier array matching the identifier array of at least one other remote unit, repeating steps (3)(b)-(c) until all remote units of the plurality of remote units have been silenced; and (4) enabling communication of the plurality of remote units in the fire loop.

Viewed from a third aspect, the invention provides a computer-readable storage medium comprising instructions which, when executed by a processor of a fire panel, will cause the fire panel to perform a method of addressing a plurality of remote units electrically connected to the fire panel in a fire loop, and the method comprises: (1) requesting an initial identifier from each remote unit; (2) for each remote unit which responds with a unique initial identifier: (a) assigning a unique address to the remote unit; and (b) silencing the response of the configured remote unit to further identifier requests; (3) for each remote unit which responds with an initial identifier matching the initial identifier of at least one other remote unit: (a) initialising an identifier array with the initial identifier for the remote unit in question; (b) requesting another identifier and adding it to the identifier array for the remote unit; (c) for each remote unit which responds with a unique identifier array: (i) assigning a unique address to the remote unit; and (ii) silencing the response of the configured remote unit to further identifier requests; (d) for each remote unit which responds with an identifier array matching the identifier array of at least one other remote unit, repeating steps (3)(b)-(c) until all remote units of the plurality of remote units have been silenced; and (4) enabling communication of the plurality of remote units in the fire loop.

With the present system and method it is possible for the fire panel to automatically configure the addresses of all the remote units that are connected to the fire panel in the fire loop. Each remote unit is identified via a unique identifier, and this identification can be used during the later configuration of a unique address. This, for example, in step (2)(a) the address for the remote unit may be configured using the unique initial identifier as a (temporary) means to identify the remote unit, and/or in step (3)(c)(i) the address for the remote unit may be configured using the unique identifier array as a (temporary) means to identify the remote unit. In example embodiments, the unique addresses that are assigned are a sequence of address data, e.g. data representing a numeric sequence. This automatic process, controlled by the fire panel, enables a fast and dependable installation/set-up for the fire system. Furthermore, compared to the prior art manual addressing methods requiring electronic or electro-mechanical devices, the remote unit is considerably simplified.

The probabilistic approach to a method of automatic addressing compared to conventional automatic addressing methods reduces the time taken to uniquely address each remote unit, and is particularly effective in systems where there is a large number of remote units.

For example, a method of automatic addressing may consider utilising the unique serial number of a remote unit (which is programmed/assigned during manufacture) to configure its address within the fire loop. Generally, a serial number constitutes, at least, a 32-bit value which ensures that repetition is rare (a 32-bit serial number has over 4 billion possible combinations) and thus it is highly unlikely that a remote unit using its serial number as an identifier will share the same identifier as another remote unit (e.g. a serial number is a unique identifier for that remote unit).

However, it should be noted that the maximum number of remote units that are allowed to be consecutively connected, without being separated by an isolator, is commonly limited (according to local common safety rules and regulations) to 32 remote units. Thus, in a fire loop where there is 32 remote units wired consecutively without any isolators in between, the identifier of each remote unit in this portion of the fire loop only needs, for example, to have a length of 5 bits in order to guarantee there is enough combinations for the other 31 identifiers to also be unique. By contrast, a long alphanumeric serial number may require a significant number of bits to be fully represented.

With the proposed arrangement, the fire panel is able to address one of a group of remote units connected in sequence using an identifier provided by the remote unit, wherein the length of the identifier is minimised while still ensuring that it is unique. The unique address that is assigned to the remote units "found" via the unique identifiers may advantageously be a sequence of address numbers or other unique address data that have fewer bits than the unique identifiers themselves. Alternatively, the unique address can be the unique identifier or may be based on or otherwise use the unique identifier as part of the address. Thus, compared to a method that may utilise long serial numbers to uniquely address each remote unit, the present method reduces the data storage costs and data transmission speeds of the addressing process.

The remote units are electrically connected to the fire panel in a loop configuration, and the loop circuit may comprise connecting wiring starting and finishing at the fire panel. The loop wiring is responsible for distributing power to the devices on the fire loop as well as allowing for communication between the devices on the loop. The fire panel may be configured to monitor alarm conditions and possible emergencies in the building based on signals received from at least some of the remote units, and may be configured to trigger an alarm condition in at least some of the remote units in response to an indication of a possible emergency. The fire panel may be configured to monitor the voltage and/or current in the circuit in order to detect any signals from the remote units, and may comprise means for altering the voltage and/or current in the circuit in order to trigger an alarm condition throughout the loop. The fire panel may be further configured to monitor faults in the circuit, such as short circuits and/or line breaks.

The current in the standby condition may be less than 100 μA. If a remote unit comprises an indicating device, the remote unit may be configured to switch to an alarm condition when a condition indicative of a possible emergency is detected, and modulate the current in the loop accordingly. The fire panel may be configured to detect this modulation in the current and, in response, communicate a fire alarm condition to the remaining remote units by modulating the voltage throughout the loop.

The fire panel may comprise a loop controller, which may be for controlling the operation of the loop. The loop controller may be a part of a fire panel control system that also has overall control of the fire panel and its functions, or it may be a separate hardware or software element compared to such a control system. The loop controller may be a central processing unit (CPU). The loop controller may be configured to determine a response to the communications from the remote units. For example, in response to information from one of the remote units, the loop controller may be configured to determine that all or some of the remote units should enter an alarm condition. The loop controller may be configured to determine that only the remote units in the same zone as the emergency should enter an alarm condition, and/or that some remote units should enter an alarm condition at different times than others. This may aid efficient evacuation of the building in the event of an emergency.

The possible emergency may be related to a fire, for example, but it will be appreciated that the fire system may also be used for also other emergencies, such as non-fire emergencies requiring activation of an evacuation procedure.

The fire panel may be configured to periodically poll at least some of the remote units to monitor their status during normal operation of the fire system. The fire panel may be configured to carry out this polling at regular time intervals. The fire panel may be configured to carry out this polling based on a predetermined communications protocol, and the frequency of polling may be determined based on the predetermined communications protocol. The fire panel may be configured to poll at least one of the remote units by transmitting one or more polling signals. The polling signal (s) may be encoded with an address of a remote unit, which may be used to communicate which remote unit the polling signal is intended for. The fire panel may be configured to poll each remote unit individually, and/or may be configured to poll groups of remote units at the same time. Polling groups of remote units at the same time may shorten the amount of time needed to poll the whole loop. The polled remote unit(s) may be configured to respond with a signal giving the status of the remote unit(s). The response signal may further comprise other information, such as the address or manufacturer code of the remote unit(s). As a result of this polling, the fire panel may be able to detect an approaching alarm condition and may take action accordingly.

The remote units may comprise a unit controller. The unit controller may be a microcontroller. During the normal mode of operation, the unit controller may be configured to receive and analyse any signals from the fire panel. The unit controller may be configured to decode any signals from the fire panel such that the encoded address can be determined. The unit controller may therefore be configured to determine whether it is the remote unit that the signal is intended for based on the decoded address. Alternatively, the remote units may comprise a unit transceiver for decoding signals received from the fire panel. The unit controller may be configured to determine how to respond to signals from the fire panel. For example, if a signal from the fire panel is a polling signal, the unit controller may be configured to determine the status of the remote unit and communicate this information back to the fire panel. Alternatively, if the signal from the fire panel indicates an alarm condition, the unit controller may be configured to trigger an alarm condition in the remote unit.

The fire panel may comprise means for communicating a fire alarm condition or a fault status to an operator and/or occupant of the building. These means may comprise a display and/or LED lights. For example, the fire panel may display one form of visual feedback (e.g. lighting up one LED light) when a fire alarm condition is detected, and display one form of visual feedback (e.g. lighting up a different LED light) when a fault in the circuit is detected. Additionally or alternatively, the fire panel display may show information pertaining to the detected fire alarm condition or fault. This information may inform an operator and/or occupant of the building of the source of the alarm condition or fault, and may comprise the address of the relevant remote unit and the zone in which it is located.

The plurality of remote units may comprise a voltage sensor for detecting voltage in the loop, and may be configured to enter an alarm condition when the detected voltage indicates a possible emergency. The voltage sensor may be configured to detect modulations in voltage in the loop. The detected modulations in voltage may be encoded with alarm information. For example, the detected modulations in voltage may be encoded with a digital binary code that contains alarm information. In the normal mode of operation, the fire panel may be configured to transmit the modulations in voltage and encode the modulations in voltage with the alarm information. The voltage sensor may be configured to communicate the detected modulation in voltage to the unit controller and/or the unit transceiver. The unit transceiver and/or the unit controller may be configured to decode the detected modulation in voltage, such that the alarm information encoded in the modulation in voltage can be determined. If the decoded alarm condition is determined to be indicative of a possible emergency, the unit controller and/or the unit transceiver may trigger the remote unit to enter an alarm condition. Additionally or alternatively, the voltage sensor may comprise means for decoding the detected modulation in voltage, and may be configured to trigger an alarm condition in the remote unit if the decoded alarm information of the detected modulation in voltage is indicative of an alarm condition.

The detected modulations in voltage may be encoded with address information. The address information may comprise an individual address and/or a zone address of the remote unit that has detected the possible emergency. The address information may be encoded in the form of digital binary code. In the normal mode of operation, the fire panel may be configured to encode the modulations in voltage with the address information. The unit transceiver and/or the unit controller of the remote units may be configured to decode the detected modulation in voltage such that the address information encoded in the modulation in voltage can be determined. Additionally or alternatively, the voltage sensor may comprise means for decoding the address information in the detected modulation in voltage. The unit controller may be configured to determine a response based on the decoded alarm information and the decoded address information. For example, the unit controller may determine that a different remote unit should only enter an alarm condition if it is in the same zone as the remote unit that has detected the possible emergency.

At least one of the remote units may comprise an indicating device, which may be a device for sensing conditions or for receiving inputs from users. For example, the indicating device may include one or more of: manual call points; smoke detectors; heat detectors; other building sensors used for fire or heat detection, such as room thermostats; sensors for supervised doors; sensors for supervised fire extinguishers; water flow sensors; and so on. Input-output modules may be provided for handling information from some types of sensors that may lie outside of the fire system, such as thermostats or water flow sensors. Such information from sensors may be used with master-slave communications via the loop, and thus can add extra information to enable the fire panel to determine a course of action to take. Additionally or alternatively, input-output modules may be provided for activating fire extinguishers, fire sprinklers, automatic door opening and/or closure systems, or door locking systems. The indicating device may provide inputs for triggering an alarm condition of the fire system.

At least one of the remote units may comprise an indicator device, which may be a device for indicating an alarm condition of the fire system, such as audible or visible devices. The indicator device may include one or more of: sirens; bells; speech sounders; other types of sounders; lights; beacons or remote indicators. The indicator device may also include one or more transmitter devices for sending alarm notifications to users. Alarm notifications may be sent to local users, for example via wireless transmission of notifications to a mobile device, and/or may be sent to remote users such as building management authorities and/or emergency services.

At least one of the remote units may comprise a combined indicating and indicator device, for example a device including detection capabilities along with an alarm, such as smoke detectors also including an audible alarm. Such a remote unit may include combinations of any of the functions discussed above in relation to the indicating and indicator devices.

At least one of the remote units may comprise a connection module for enabling communication of an alarm condition to an external system. The connection module may be configured to connect to external hardware, and may be configured to communicate the alarm condition to the external hardware when the connection module enters an alarm condition. The external hardware may, for example, be configured to trigger an emergency call or some other form of alert to emergency services, and/or trigger an alarm condition in an external alarm system.

The invention extends to a building incorporating the fire system, wherein the plurality of remote units may be distributed within the building.

The fire panel is configured with an addressing mode for addressing the plurality of remote units electrically connected to the fire panel in a fire loop. During set-up of the fire system the addressing mode may be initiated by an operator/installer. Alternatively, the addressing mode may be automatically initiated upon supplying of power to the fire panel during set-up of the fire system.

Before the addressing of the plurality of remote units, the fire panel is unable to selectively poll one or more remote units of the plurality of remote units as each remote unit does not have a unique address which can be encoded within communications. Therefore, a communication cannot be indicated as being for a certain remote unit(s). Instead, an unaddressed polling signal sent into the fire loop will elicit a response from every remote unit.

However, the fire panel may be able to target one or more remote unit(s) if they have other parameters/identifiers that are unique to them, as this information can be used to ‘address’ the polling signal (or used as a temporary address prior to assigning an official address to a specific remote unit with a targeted addressing instruction). For example, a polling signal may be encoded such that only those remote units with a selected parameter equal to ‘1’ know that it was intended that they respond to the polling signal with the requested status/information. The problem faced by automatic addressing systems however is that finding a parameter that is unique to one remote unit on the fire loop, given that there are often many remote units on a fire loop, is very difficult.

The step of requesting an initial identifier from each remote unit may comprise requesting a first identifier from each remote unit. For example, the fire panel may request the identifier stored in a first field of a memory of each remote unit. Alternatively, the request for an initial identifier may comprise a request for an (unspecified) identifier from each remote unit, and each remote unit may randomly select an identifier from those stored in its memory, or randomly generate an identifier for the response to the request.

Where each remote unit comprises a memory in which is stored a plurality of identifiers, the identifiers may be stored in the memory of the remote units during manufacture of the remote units.

Where each remote unit is configured to randomly generate an identifier in response to a request for an identifier, each remote unit may store the randomly generated identifier in the memory of the remote unit.

The remote unit may (randomly or otherwise) select a first, second, third, etc. identifier of the remote unit and provide the value of these identifiers in response to sequential requests from the fire panel.

The fire panel is able to analyse the response from the plurality of remote units to determine if one or more of the remote units responds with a unique identifier. This can be done, for example, by examining the current modulation response from the plurality of remote units.

Where a remote unit responds with a unique initial identifier (in other words, if the fire panel determines that the initial identifier of the remote unit in question does not match the initial identifiers of any of the other remote units on the loop/loop portion), then the fire panel is free to configure the address of the remote using the unique initial identifier.

The fire panel is able to use the unique initial identifier to address a configuration communication to the intended remote unit. The configuration communication may assign an official address to the intended remote unit so that the remote unit will respond to future communications encoded with that official address.

The unique address assigned to the remote unit may be equal to the initial identifier, or may comprise the initial identifier. Alternatively the unique addresses may be an address that comprises other or additional information, such as an address using a sequence of unique address numbers. The unique address may be based on the location of the remote unit in the loop. In other words, the unique addresses of the plurality of the remote units may be ordered based on the relative positions of the remote units to the fire panel from one end of the loop.

The fire panel may maintain an internal database comprising the assigned unique addresses of the plurality of the remote units in the fire loop.

The assigned addresses may be stored in the internal database of the fire panel. Additionally, the fire panel may keep a record of available addresses not assigned to a remote unit in the fire loop.

The assigned address may be used to facilitate all further communication with the configured remote unit.

Silencing the response of the configured remote unit to further identifier requests may comprise preventing the configured remote unit from responding to any more requests for identifiers from the fire panel. Silencing the response of the configured remote unit to further identifier requests may comprise suppressing the configured remote unit, e.g. such that it does not respond to any requests or communications until the addressing method has been completed. Further identifier requests may comprise, or consist of, the requests of each iteration of step (3)(b) of the method.

Silencing the response of the configured remote unit to further identifier requests may comprise modifying (e.g. by the fire panel) the further identifier requests so that the configured remote unit will not register them.

Where a remote unit does not respond with a unique initial identifier (in other words, if the fire panel determines that the initial identifier of the remote unit is the same as one or more of the initial identifiers of any of the other remote units on the loop/loop portion in question), then the fire panel cannot use the initial identifier alone to configure the address of the remote unit as this will result in a 'double fault' (e.g. one or more remote units will respond to communications addressed to a single official address) and normal/proper communication of the fire system will not be possible.

As such, the fire panel is configured to request further identifiers from each remote unit on the loop/loop portion in question (that have not already been configured and silenced). The request may be for a further and/or different identifier to the initial identifier. The request may include a request for the initial identifier and for one or more further identifiers. For example, where the fire panel has already requested a first identifier from each remote unit, or the identifier stored in a first field of the memory of each remote unit, but some remote units have not be configured, the fire panel may request a second identifier from each (un-configured) remote unit, or the identifier stored in a second field of the memory of each (un-configured) remote unit.

Alternatively, the request for another identifier may comprise a request for a further (unspecified) identifier from each remote unit, and each remote unit may (randomly or otherwise) select an identifier different to the selected initial identifier from those stored in the memory, or randomly generate another identifier for the response to the further request.

The initial identifier is used to initialise an identifier array. Each remote unit has a corresponding identifier array. For those remote units where the initial identifier is unique, the identifier array will only consist of the initial identifier. The maximum length of the identifier array for a particular remote unit may be limited by the number of identifiers stored in the memory of that remote unit. Alternatively, where the remote unit in question is capable of randomly generating identifiers in response to requests, the maximum length of the identifier array may not be restricted.

For those remote units where the initial identifier is not unique, the next requested identifier for the remote unit in question is added to the corresponding identifier array (which may be stored by the fire alarm panel). Alternatively, the fire panel may not store the requested identifiers, but in response to each request for a further identifier (e.g. step 3(b)), each (un-configured) remote unit returns all identifiers previously returned and a further additional identifier. In other words, in response to each request for a further identifier, each (un-configured) remote unit returns the updated identifier array, wherein the requested identifier array comprises the initial identifier and at least one further identifier (depending on which iteration of step 3(b) the process is at).

Where a remote unit responds with a unique identifier array (in other words, if the fire panel determines that the identifier array of the remote unit does not match the identifier array of any of the other remote units on the loop/loop portion in question), then the fire panel is free to configure the address of the remote unit using the unique identifier array.

The fire panel is able to use the unique identifier array to address the configuration communication to the intended remote unit.

The unique address may be equal to the identifier array.

The unique address may comprise additional or alternative information. The unique address may be based on the location of the remote unit in the loop. In other words, the unique addresses of the plurality of the remote units may be ordered based on the relative positions of the remote units to the fire panel from one end of the loop.

The unique address may be the officially assigned address, and as such may be stored in the address database of the fire panel.

The unique address may be used to facilitate all further communication with the configured remote unit.

Silencing the response of the configured remote unit to further identifier requests may comprise preventing the configured remote unit from responding to any more requests for identifiers from the fire panel. Silencing the response of the configured remote unit to further identifier requests may comprise suppressing the configured remote unit, e.g. such that it does not respond to any requests or communications until the addressing method has been completed. Further identifier requests may comprise, or consist of, the requests of each iteration of step (3)(b) of the method.

Silencing the response of the configured remote unit to further identifier requests may comprise modifying (e.g. by the fire panel) the further identifier requests so that the configured remote unit will not register them.

Where a remote unit does not respond with a unique identifier array (in other words, if the fire panel determines that the identifier array of the remote unit is the same as one or more of the identifier arrays of any of the other remote units on the loop/loop portion in question), then the fire panel cannot use the identifier array as it stands to configure the address of the remote unit as this will result in a 'double fault' (e.g. one or more remote units will respond to communications addressed to a single official address) and normal/proper communication of the fire system will not be possible.

As such, the fire panel is configured to request further identifiers from each remote unit on the loop/loop portion in question (that have not already been configured and silenced). The request may be for a further and/or different identifier to the identifiers previously requested. The request may include a request for the initial identifier and for one or more further identifiers. For example, where the fire panel has already requested a first identifier and a second identifier from each remote unit, or the identifiers stored in a first field and a second field of the memory of each remote unit, but some remote units have still not been configured, the fire panel may request a third identifier from each (un-configured) remote unit, or the identifier stored in a third field of the memory of each (un-configured) remote unit.

Alternatively, the request for another identifier may comprise a request for a further (unspecified) identifier from each remote unit, and each remote unit may (randomly or otherwise) select an identifier different from the previously selected identifiers from those stored in the memory, or randomly generate another identifier for the response to the further request.

Accordingly, the earlier described steps of (3)(b)-(c) are repeated iteratively until each remote unit of the fire loop/loop portion in question has a unique identifier array, and has been configured with an official address using the unique identifier array (and subsequently silenced).

The fire panel is able to identify when all of the remote units of the plurality of remote units (on the loop/loop portion in question) have been silenced. For example, once no responses are received to a request for another/further identifiers, then it can be determined that all remote units have been silenced and therefore configured.

To conclude the automatic addressing, the communication of the plurality of remote units in the fire loop/loop portion in question is enabled (e.g. activated) by the fire panel.

Enabling communication of the plurality of remote units in the fire loop/loop portion in question may comprise initialising the plurality of remote units.

Enabling communication of the plurality of remote units may comprise resetting the fire loop and/or the plurality of remote units.

Enabling communication of the plurality of remote units may comprise sending a command to each of the plurality of remote units.

Alternatively, the remote units may be silenced for a predetermined period of time. The period of time may be predetermined to be longer than the time taken for the automatic addressing process to finish.

In other words, following communication of the plurality of remote units (which have all been configured with a unique address) being enabled, the plurality of remote units are no longer silenced and can communicate with the fire panel in accordance with normal modes of operation (as dictated by the specific protocols in question).

The fire loop may comprise one or more isolator units configured to separate the fire loop into a plurality of loop portions. Loop isolator units may be installed to protect the continuity of the fire loop in the event that the circuit is damaged (e.g. a short circuit as a result of a fire). If damage occurs to a stretch of circuitry, the isolator units connected to either end of that loop portion are 'opened' to isolate it—separating it from the remaining fire loop. However, none of the remaining remote units, on either side of the isolated loop portion, have been lost from the fire system, as the fire panel is able to communicate with the remaining loop portions from either end of the fire loop.

Thus, the use of isolator units can minimise the area of coverage lost in the case of a short circuit (e.g. as a result of fire damage) in the fire loop by isolating the loop portion containing the short circuit from the rest of the fire loop.

As discussed earlier, the fire loop may have up to 32 remote units connected in succession in the fire loop between isolator units. In other words, the fire loop may have up to 32 remote units on each of the plurality of loop portions.

Where the remote units are separated into a plurality of loop portions by one or more isolator units, the fire panel may implement the addressing method in order to accommodate this. The method may comprise opening all isolator units; for each isolator unit, in sequence from one end of the fire loop: performing steps (1)-(3) in respect of the remote unit(s) not isolated from the fire panel; and closing the isolator unit; and performing step (4) once all remote units of the plurality of remote units have been suppressed.

As such, the fire panel operates on each loop portion consecutively (starting at one end of the fire loop) in order to address each remote unit on the loop portion in question (separated by isolators) before moving onto the remote units of the next loop portion by opening the isolator unit.

For example, considering a fire loop with one isolator unit, the fire panel would first open this isolator unit so that it can only communicate with the remote unit(s) on the first loop portion. The fire panel then applies the probabilistic addressing method to the first loop portion, as described above, in order to configure the address and suppress the response of the remote unit(s) on the first loop portion. The isolator unit is then closed and the fire panel is able to communicate with both the first loop portion and the second loop portion. The fire panel then applies the probabilistic addressing method to the loop, as described above. However, because the remote unit(s) on the first loop portion have been suppressed, they do not respond to any identifier requests of the fire panel. As such, only the remote unit(s) in the second loop portion respond to/interact with the requests of the fire panel and are configured and suppressed as described earlier.

Accordingly, the addressing method can be flexibly applied to any distribution of isolator units and remote units on the fire loop while still providing the advantages discussed above.

One or more of the plurality of remote units may comprise an embedded isolator configured to separate the fire loop into a plurality of loop portions. In other words, an isolator may be integrated into one or more remote units. This can be advantageous as it removes the need for distinct isolator units. The use of remote units with embedded isolators can minimise the area of coverage lost in the case of a short circuit (e.g. as a result of fire damage) in the fire loop by isolating the loop portion containing the short circuit from the rest of the fire loop, whilst reducing installation costs compared to using distinct isolator units.

In accordance with the discussions above, the fire loop may have up to 31 remote units connected in succession in the fire loop between remote units with embedded isolators. In other words, the fire loop may have up to 32 remote units on each of the plurality of loop portions which can be isolated from one another.

Where the remote units are separated into a plurality of loop portions by one or more isolator units, the fire panel may implement the addressing method in order to accommodate this. The operation of the addressing method for fire loops with remote units with embedded isolators may be similar to the operation of the addressing method for fire loops with distinct isolator units. The method may comprise opening the embedded isolator of all embedded isolator remote units; for each embedded isolator remote unit, in sequence from one end of the fire loop: performing steps (1)-(3) in respect of the remote unit(s) not isolated from the fire panel; and closing the embedded isolator of the configured embedded isolator remote unit; and performing step (4) once all remote units of the plurality of remote units have been suppressed.

The one or more identifiers of each remote unit may correspond to any technical or manufacturing information of the remote unit in question. For example, the one or more identifiers may be the individual elements of a serial number of the remote unit. In another example, the one or more identifiers may include data indicating a type of the remote unit.

Alternatively, the one or more identifiers may be randomly calculated.

The one or more identifiers of each remote unit may be stored in the memory of the remote unit during manufacture. Alternatively, the unit controller of each remote unit may be configured to randomly generate and store the one or more identifiers upon initialisation of the remote unit (e.g. upon connection to the fire loop/receiving power).

The memory of each remote unit may have 16 or fewer identifiers stored therein.

The memory of each remote unit may have 12 or fewer identifiers stored therein.

The memory of each remote unit may have 8 or fewer identifiers stored therein.

The memory of each remote unit may have 5 or fewer identifiers stored therein.

Where each remote unit comprises a memory in which is stored a plurality of identifiers, the memory of the remote unit may be configured only to store enough identifiers such that there are a sufficient number of combinations for each remote unit on the loop/loop portion in question to have a unique identifier combination. For example, the number of remote units on an isolated loop portion is generally restricted to 32. If each identifier is a binary digit then the remote unit may only require 5 identifiers stored therein. If each identifier is a decimal digit then the remote unit may only require 2 identifiers stored therein. If each identifier is an alphanumeric character (e.g. a number or a letter) then the remote unit may only require 1 identifier stored therein.

If, at the end of the addressing method, the fire panel determines that all of the identifiers of a particular remote unit matches all of the identifiers of at least one other remote unit, then the fire panel is configured to raise a notification to alert the installer/user, and/or configure an address of the remote unit based on one of the available combination(s) of identifiers. This issue does not arise with remote units capable of generating random identifiers in response to an identifier request.

BRIEF DESCRIPTION OF THE DRAWINGS

Certain embodiments of the disclosure will now be described by way of example only and with reference to the accompanying drawings in which.

Figure 1:
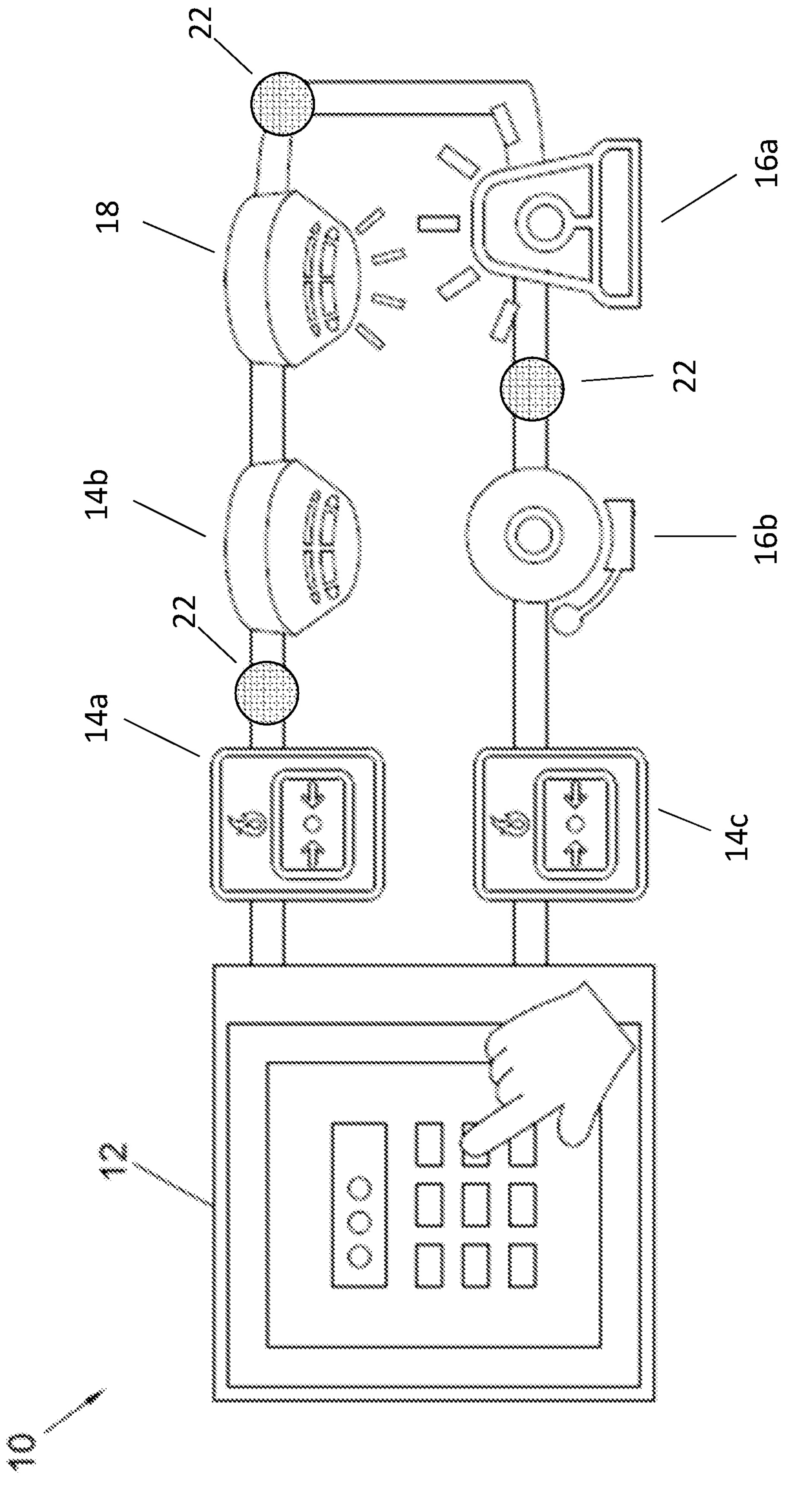
FIG. 1 shows a schematic diagram of a fire system.

DETAILED DESCRIPTION OF THE INVENTION connected in a loop configuration, joined by wire 20, with each remote unit positioned at a different location along the loop. This fire panel 12 may be used to additionally provide power to the remote units 14, 16, 18. Alternatively, the remote units 14, 16, 18 may be powered independently of the fire panel 12. The remote units of FIG. 1 comprise indicating devices 14, indicator devices 16, and combined indicating and indicator device 18. Indicating devices 14 are used to detect conditions indicative of an emergency, and may include manual call points, smoke detectors, and/or heat detectors. Indicator devices 16 are used to alert users of an emergency condition and may include audible or visual devices, such as lights and/or bells. The combined indicating and indicator device 18 has a detection capability alongside an alarm, and may comprise a fire and/or smoke alarm. Although not shown in FIG. 1, the fire system may further comprise fire suppression devices and/or a connection module for enabling communication with external devices.

The remote units 14, 16, 18 communicate with the fire panel 12 in a master-slave relationship. The remote units 14, 16, 18 send signals to the fire panel 12 through the wire 20 in the form of modulations in the current. These signals inform the fire panel 12 of the status of the remote units 14, 16, 18. The modulations in the current created by the remote units 14, 16, 18 may be increases or decreases in current, and may be encoded with information such as alarm, address, and/or fault information. For example, the modulations in current may be encoded with a digital binary code containing such information. In response, the fire panel 12 may issue a command to the remote units 14, 16, 18. For example, if indicating device 14 modulates the current in such a way that is indicative of a possible emergency, the fire panel 12 may send a command to the remaining remote units 14, 16, 18 instructing them to enter an alarm condition. Alternatively, the fire panel 12 may send this command to only some of the remote units 14, 16, 18, depending on the location and nature of the possible emergency. The command may be in the form of a modulation of the voltage, and may be encoded with information. For example, the command may be encoded with a digital binary code containing such information. Typically, the current is modulated in one direction through the loop, whilst the voltage is modulated in the opposite direction. The remote units 14, 16, 18 therefore each comprise a voltage sensor, and are configured to enter an alarm condition when they detect a voltage that is indicative of a possible emergency.

The fire panel 12 may also periodically send polling signals to the remote units 14, 16, 18, and the remote units 14, 16, 18 may respond with information regarding their status, their address, and/or their manufacturer code. The fire panel 12 may poll the remote units 14, 16, 18 at regular time intervals, which may be determined based on a communications protocol that the fire system 10 is employing. Thus, the frequency of polling may be determined by the communications protocol of the fire system 10. The fire panel 12 may poll the remote units 14, 16, 18 by transmitting one or more commands in the form of one or more polling signals. As mentioned above, these polling signals may be encoded with information, such as an address of a remote unit. This information may be used to communicate which remote unit 14, 16, 18 the polling signal is intended for. The fire panel 12 may comprise means for alerting a user of a possible emergency. These means can include, but are not limited to, lights and/or a display.

The loop also comprises one or more isolator units 22. Isolator units are installed in fire loops to protect the continuity of the circuit in the event that a part of the detection loop is damaged (for whatever reason, e.g. fire). If damage occurs to a particular stretch of circuitry of the loop, the isolators connected to either end of that piece of the loop will cut it out of the circuit, thus isolating it from the remaining devices. For instance, referring to FIG. 1, if damage has occurred to the indicator device 16, the two isolator units 22 adjacent to the indicator device 16 allow for that device 16 and that corresponding section of the loop to be bypassed. Thus, as a result of the action of the isolator units 22, none of the remaining remote units 14, 16, 18 outside of the isolated section have been lost from the fire loop.

Alternatively or additionally, one or more of the remote units 14, 16, 18 may comprise an integral/embedded isolator unit 22.

The operation of the fire panel 12 is controlled by a loop controller, which may be a central processing unit (CPU). The loop controller may process the information received from the remote units 14, 16, 18 and decide how to respond. The loop controller may decide whether it is necessary to communicate an alarm condition to some or all of the remaining remote units 14, 16, 18. The loop controller may cause the remote units 14, 16, 18 to enter an alarm condition at different times, in order to aid and manage evacuation of a building.

For the operations described above, it is necessary for the various remote units 14, 16, 18 to be identifiable by the fire panel 12 and/or by other systems, such as systems used by the installer. An addressing system and method, automatically managed by the loop controller of the fire panel 12, is proposed herein.

As discussed earlier, the complexity of automatically addressing a plurality of remote units in a fire loop circuit is highly dependent on the types of remote units in the fire loop circuit.

Figure 2:
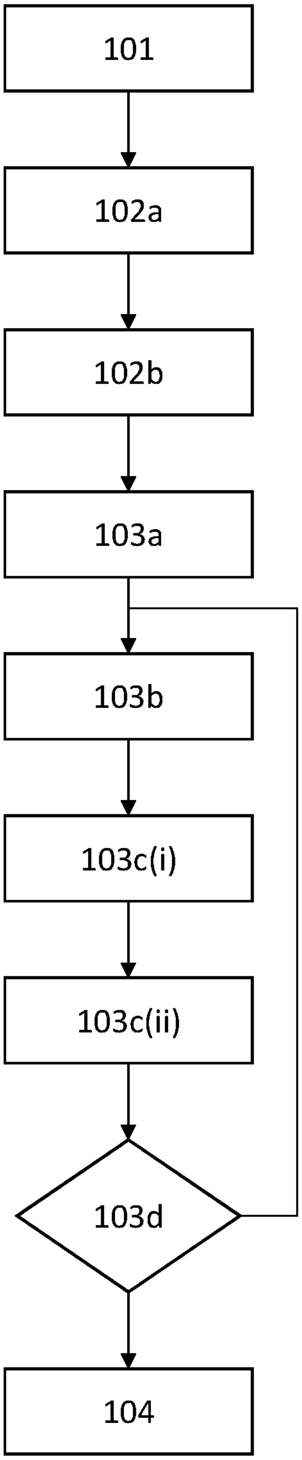
FIG. 2 shows a flow chart illustrating a method of addressing a plurality of remote units in a fire system.

As shown in FIG. 2, there is provided a method 100 of addressing a plurality of remote units which is automatic and probabilistic, making it faster and more reliable than existing methods.

The fire panel 12 utilises one or more aleatory (randomly generated) identifier fields associated with a particular remote unit to specifically target the particular remote unit in order to configure it with a unique official address. The one or more identifier fields are randomly generated and stored in a memory of the remote unit during the manufacturing process, or the remote unit is configured with the capability to randomly generate an identifier when prompted by a request for an identifier from the fire panel. Each one of the one or more identifier fields may comprise one or more bits. While the one or more identifier fields are preferably randomly generated, they may be parameters that correspond to parts of technical or manufacturer information of the remote unit in question.

When a fire loop is first installed, and prior to the plurality of remote units on the fire loop have been addressed, there is no way for the fire panel to specify the intended recipient of a communication signal, and accordingly each one of the plurality of remote units will consider that every communication signal issued by the fire panel is intended for it. Thus, typically, a fire panel is unable to automatically assign an official address to each remote unit as it is unable to target the configuration instructions to only a single remote unit.

The addressing method may be performed by initiating an addressing mode of the fire panel 12 after the fire loop has been installed and the fire panel 12 has been electrically connected to each of the plurality of remote units on the fire loop. This addressing mode may be initiated manually or configured to be initiated automatically.

Firstly, as shown in step 101, the fire panel 12 requests, from each remote unit 14, 16, 18, an initial (first) identifier. The initial identifier may be the identifier stored in a first identifier field of the memory, or may be a randomly selected field, or may be randomly generated in response to the request from the fire panel 12.

The fire panel 12 then checks which of the remote units have presented initial identifiers that are unique. An identifier presented by a remote unit is unique if it does not match (is not the same as) any of the initial identifiers presented by the rest of the plurality of remote units.

For example, in a fire loop with three remote units, if, following the request for the initial identifier, the first remote unit responds with '1', the second remote unit responds with '0' and the third remote unit responds with '0', then the first remote unit has responded with a unique initial identifier.

In step 102*a*, for each remote unit which responded to the request for an initial identifier with a unique initial identifier, the fire panel 12 is able to use the unique initial identifier to address specific configuration instructions to each one of these remote units. Thus, the fire panel 12 is able to configure the official address of the targeted remote unit and store the configuration information in its internal database. The official address may be assigned as a part of a numeric sequence of unique addresses.

Once a remote unit has been configured with an official address, it can be silenced (step 102*b*) so that it will not respond to any further polling/query communications—particularly so that it will not respond to further identifier requests.

For each remote unit 14, 16, 18 which responded to the request for an initial identifier with a non-unique (e.g. shared by at least one other remote unit) initial identifier, the fire panel 12 needs further/different information in order to be able to address a configuration communication solely to each of them.

Accordingly, the fire panel 12 sends out another request for an identifier through the fire loop (step 103*b*). As those remote units which have already been assigned an official address are silenced, this request for a further identifier is only responded to by those remote units which have not yet been configured.

At least one of the fire panel or the remote unit may keep a record of the array of identifiers presented in response to the requests from the fire panel 12. The identifier array is initialised by the initial identifier, and further identifiers are added to the identifier array as and when they are generated (step 103*a*).

For example, where the remote unit maintains the identifier array in its memory and is configured to randomly generate identifiers, in response to a request for a further identifier the remote unit will randomly generate a new identifier, add it to the identifier array and then present the updated identifier array to the fire panel 12.

As with the initial identifier, for each remote unit which responded to the further identifier request with a unique identifier array, the fire panel 12 is able to use the unique identifier array to address specific configuration instructions to each one of these remote units (step 103*c*(*i*)). Thus, the fire panel 12 is able to configure the official address of the targeted remote unit and store the configuration information in its internal database.

Once a remote unit has been identified based on the unique identifier array and then assigned a unique address, it can be silenced (step 103*c*(*ii*)) so that it will not respond to any further polling/query communications—particularly so that it will not respond to any more identifier requests.

As the identifier array increases in the number of identifiers it comprises, the probability that the identifier array is not unique decreases rapidly. Thus only very few iterations of further identifier requests (step 103(*d*)) are required before each remote unit has a unique identifier array and can be silenced.

Once all remote units have been silenced, e.g. the fire panel 12 receives no responses to a request for identifiers, then the fire panel 12 knows that the addressing of the plurality of remote units has been completed. Therefore the fire panel 12, at step 104, is able to conclude the process by re-enabling communication of all of the remote units in the loop. This can be done according to any known method.

As discussed earlier in relation to FIG. 1, the fire loop can comprise one or more isolator units 22 depending on the number of remote units 14, 16, 18 on the fire loop and/or the operating protocols of the fire system 10.

In this case, the isolator units 22 can be used to isolate certain loop portions of the loop and apply the addressing method to each of the loop portions sequentially in turn.

For example, the fire loop can open all the isolator units so that it is communicating only with a first loop portion of the fire loop (e.g. the loop portion closest to the fire panel 12 at one end of the fire loop), with the rest of the loop portions isolated from the fire panel 12.

Subsequently, the fire panel can perform the method as described above on the loop portion with which it is communicating, until all remote units along that portion of the loop have been configured with an official address, and silenced.

Once the fire panel 12 recognises that this has been done, the first isolator unit is closed, which connects the next loop portion to the previous loop portion and the fire panel 12. Therefore, the fire panel is able to send communications to both the first loop portion and the next loop portion. However, because all the remote devices on the first loop portion have been silenced, only the remote devices on the next loop portion will respond to identifier requests, and the fire panel can therefore perform the method as described above on the next loop portion.

The addressing process continues as described, with the fire panel 12 sequentially closing isolator units to introduce new loop portions one by one back into the fire loop, and configuring the addresses of all those remote units on the fire loop which have not yet been silenced.

Using the isolator units 22 to separate the fire loop into loop portions before applying the addressing method reduces the number of remote units that are being handled at any one time which reduces the probability of two or more remote units generating the same identifier(s).

As discussed earlier in relation to FIG. 1, the fire loop can comprise one or more remote units 14, 16, 18 comprising an embedded isolator. These embedded isolator units 14, 16, 18 provide the functionality of distinct isolator units 22, allowing the portion of the loop comprising the embedded isolator unit 14, 16, 18 to be isolated from the fire loop.

If all remote units have embedded isolators, the fire panel 12 is able to sequentially configure the address of each remote unit 14, 16, 18 in order along the loop, starting from the remote unit 14*a* closest to the fire panel 12.

Firstly, the fire panel 12 commands each of the plurality of embedded isolator remote units 14, 16, 18 to open their respective isolator. This isolates all remote units 14, 16, 18 from the loop.

Next, the fire panel 12 closes the embedded isolator of the first remote unit 14*a* so that the fire panel 12 is able to communicate with the first remote unit 14*a*, configures the address of the first remote unit 14*a*, and suppresses/silences the configured first remote unit 14*a*.

Subsequently, the fire panel 12 opens the embedded isolator of the first remote unit 14*a* and closes the embedded isolator of the next remote unit 14*b*, before configuring the address of the second remote unit 14*b* and suppressing/silencing the configured second remote unit 14*b*.

These steps are then repeated for each one of the plurality of remote units 14, 16, 18 in the fire loop until all the embedded isolator remote units have been configured with an official address. Finally, in order to complete the process, the fire panel 12 re-enables communication of the plurality of remote units 14, 16, 18 by sending a command signal and/or resetting the loop.

Advantageously, with this method the fire panel 12 is able to configure all the addresses of a complete loop with the addresses simply ordered by the relative position of the remote unit 14, 16, 18 from the fire panel 12 along the loop. Moreover, during the method, the fire panel 12 can detect any issue in the loop and locate it because it is managing the loop one section (each section comprising one remote unit) at a time. The fire panel 12 can store the number of remote units 14, 16, 18 installed in the fire loop and can launch a fault if this number is out of range (e.g. the number of remote units between two isolators exceeds the number as limited by the protocol).

However, if one or more remote units 14, 16, 18 do not have embedded isolators then the fire panel 12 needs some way of addressing these remote units 14, 16, 18 in between the embedded isolator remote units 14, 16, 18.

In this scenario, similar to the situation where the fire loop comprises one or more isolator units 22, the embedded isolator remote units 14, 16, 18 may be used to isolate certain loop portions of the fire loop so that the fire panel 12 can selectively apply the addressing method as discussed above.

Depending on the specific arrangement of the fire loop, it may be preferable to assign an official loop address to each one of the embedded isolator remote units 14, 16, 18 first, then closing all the embedded isolators and applying the addressing method as described above in order to assign an address to all of the remaining remote units 14, 16, 18 in the loop. Alternatively, it may be preferable to apply the addressing method as described above to each loop portion sequentially, in order to assign an official address to all of the remote units 14, 16, 18 on one loop portion before moving onto the next loop portion. In accordance with the methods as described above, the embedded isolators (and/or isolator units 22) can be used to isolate one or more loop portions from the fire panel 12 as required.

What is claimed is:

1. A method of addressing a plurality of remote units electrically connected to a fire panel in a fire loop, the method comprising:

(1) requesting an initial identifier from each remote unit;

(2) for each remote unit which responds with a unique initial identifier:

(a) assigning a unique address to the remote unit; and (b) silencing the response of the configured remote unit to further identifier requests;

(3) for each remote unit which responds with an initial identifier matching the initial identifier of at least one other remote unit:

(a) initialising an identifier array with the initial identifier for the remote unit in question;

(b) requesting a further identifier and adding it to the identifier array for the remote unit;

(c) for each remote unit which responds with a unique identifier array:

(i) assigning a unique address to the remote unit; and (ii) silencing the response of the configured remote unit to further identifier requests;

(d) for each remote unit which responds with an identifier array matching the identifier array of at least one other remote unit, repeating steps (3)(b)-(c) until all remote units of the plurality of remote units have been silenced; and (4) enabling communication of the plurality of remote units in the fire loop.

2. The method of claim 1, wherein each remote unit comprises a memory in which is stored a plurality of identifiers.

3. The method of claim 1, wherein each remote unit is configured to randomly generate an identifier in response to a request.

4. The method of claim 1, wherein the identifiers are comprised of binary digits.

5. The method of claim 1, wherein the fire loop comprises one or more isolator units separating the fire loop into a plurality of loop portions, and wherein the method comprises:

opening all isolator units;

for each isolator unit, in sequence from one end of the fire loop:

closing the isolator unit; and performing steps (1)-(3) in respect of the remote unit(s) not isolated from the fire panel; and performing step (4) once all remote units of the plurality of remote units have been silenced.

6. The method of claim 1, wherein one or more of the plurality of remote units comprise an embedded isolator, the one or more embedded isolator remote units separating the fire loop into a plurality of loop portions, and wherein the method comprises:

configuring the addresses of the embedded isolator remote units;

opening the embedded isolator of all embedded isolator remote units;

for each embedded isolator remote unit, in sequence from one end of the fire loop:

performing steps (1)-(3) in respect of the remote unit(s) not isolated from the fire panel; and closing the embedded isolator of the embedded isolator remote unit; and performing step (4) once all remote units of the plurality of remote units have been silenced.

7. The method of claim 1, comprising:

(1) identifying that a new remote unit has been added to the fire loop;

(2) silencing the response of each of the configured remote units to identifier requests;

(3) requesting an initial identifier from the newly-added remote unit;

(4) assigning a unique address to the remote unit; and (5) enabling communication of the plurality of remote units in the fire loop.

8. A fire system for a building, the fire system comprising:

a fire panel for monitoring the building and activating an alarm; and a plurality of remote units electrically connected to the fire panel in a fire loop;

wherein the fire panel is configured with an addressing mode for addressing the plurality of remote units in the fire loop, the addressing mode comprising:

(1) requesting an initial identifier from each remote unit;

(2) for each remote unit which responds with a unique initial identifier:

(a) assigning a unique address to the remote unit; and (b) silencing the response of the configured remote unit to further identifier requests;

(3) for each remote unit which responds with an initial identifier matching the initial identifier of at least one other remote unit:

(a) initialising an identifier array with the initial identifier for the remote unit in question;

(b) requesting a further identifier and adding it to the identifier array for the remote unit;

(c) for each remote unit which responds with a unique identifier array:

(i) assigning a unique address to the remote unit; and (ii) silencing the response of the configured remote unit to further identifier requests;

(d) for each remote unit which responds with an identifier array matching the identifier array of at least one other remote unit, repeating steps (3)(b)-(c) until all remote units of the plurality of remote units have been silenced; and (4) enabling communication of the plurality of remote units in the fire loop.

9. The fire system of claim 8, wherein the fire panel is electrically connected to the fire loop at each end and is configured to be able to control the voltage and/or current in the fire loop from either end of the fire loop.

10. The fire system of claim 8, wherein each remote unit comprises a memory in which is stored a plurality of identifiers.

11. The fire system of claim 8, wherein each remote unit is configured to randomly generate an identifier in response to a request.

12. The fire system of claim 8, wherein the identifiers are comprised of binary digits.

13. The fire system of claim 8, wherein the fire loop comprises one or more isolator units separating the fire loop into a plurality of loop portions, and wherein the addressing mode comprises:

opening all isolator units;

for each isolator unit, in sequence from one end of the fire loop:

closing the isolator unit; and performing steps (1)-(3) in respect of the remote unit(s) not isolated from the fire panel; and performing step (4) once all remote units of the plurality of remote units have been silenced.

14. The fire system of claim 8, wherein one or more of the plurality of remote units comprise an embedded isolator, the one or more embedded isolator remote units separating the fire loop into a plurality of loop portions, and wherein the addressing mode comprises:

configuring the addresses of the embedded isolator remote units;

opening the embedded isolator of all embedded isolator remote units;

for each embedded isolator remote unit, in sequence from one end of the fire loop:

performing steps (1)-(3) in respect of the remote unit(s) not isolated from the fire panel; and closing the embedded isolator of the embedded isolator remote unit; and performing step (4) once all remote units of the plurality of remote units have been silenced.

15. A computer-readable storage medium comprising instructions which, when executed by a processor of a fire panel, will cause the fire panel to perform a method of addressing a plurality of remote units electrically connected to the fire panel in a fire loop, and the method comprises:

(1) requesting an initial identifier from each remote unit;

(2) for each remote unit which responds with a unique initial identifier:

(a) assigning a unique address to the remote unit; and (b) silencing the response of the configured remote unit to further identifier requests;

(3) for each remote unit which responds with an initial identifier matching the initial identifier of at least one other remote unit:

(a) initialising an identifier array with the initial identifier for the remote unit in question;

(b) requesting another identifier and adding it to the identifier array for the remote unit;

(c) for each remote unit which responds with a unique identifier array:

(i) assigning a unique address to the remote unit; and (ii) silencing the response of the configured remote unit to further identifier requests;

(d) for each remote unit which responds with an identifier array matching the identifier array of at least one other remote unit, repeating steps (3)(b)-(c) until all remote units of the plurality of remote units have been silenced; and (4) enabling communication of the plurality of remote units in the fire loop.

* * * * *